April 5, 1927. 1,623,895
O. W. TURNBAUGH
WHEEL CHOCK
Filed June 11, 1926
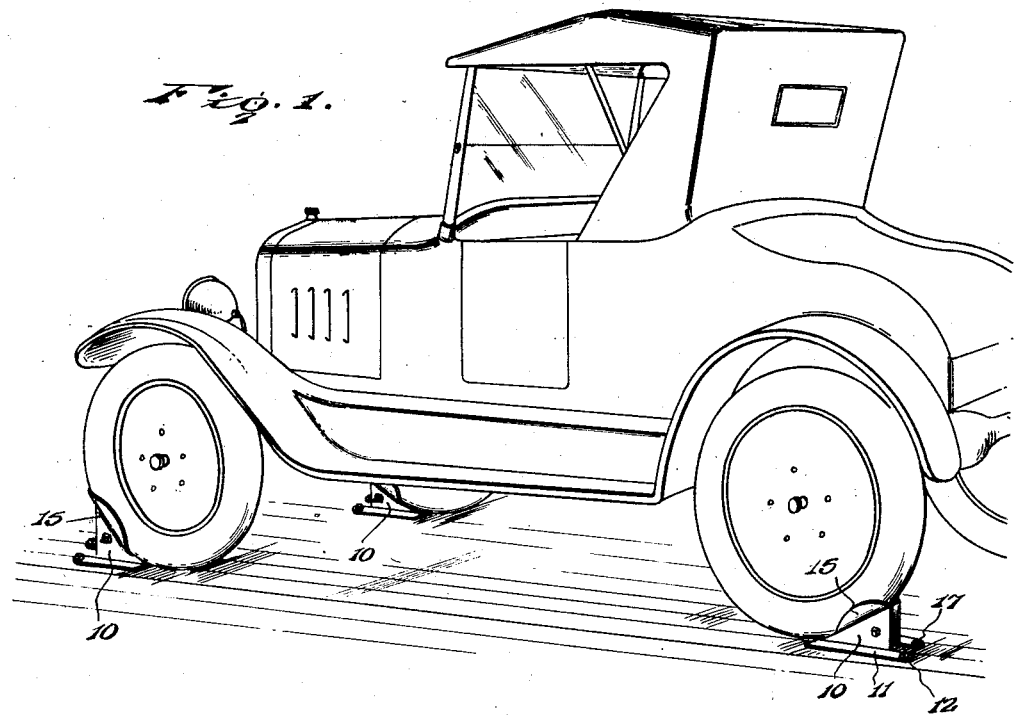
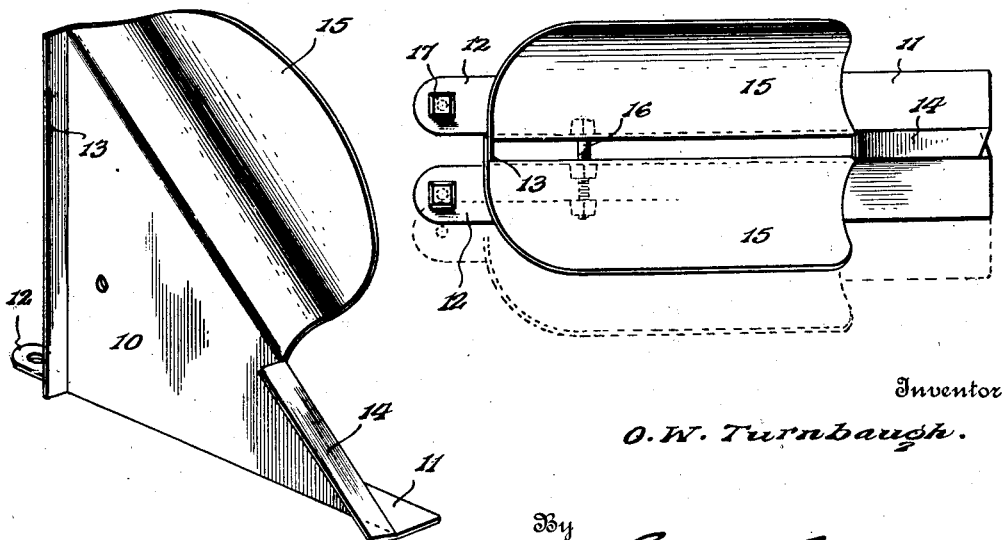
Inventor
O. W. Turnbaugh.
By Lacey & Lacey, Attorneys Patented Apr. 5, 1927.

1,623,895

UNITED STATES PATENT OFFICE.

ORA W. TURNBAUGH, OF CAMBRIDGE, OHIO.

WHEEL CHOCK.

Application filed June 11, 1926. Serial No. 115,333.

This invention relates to an improved wheel chock particularly designed for use in connection with the shipment of motor vehicles and seeks, among other objects, to provide a simple and efficient device of this character which may be employed for chocking the wheels of a vehicle during the shipment thereof and which, upon the delivery of the vehicle, may be returned to the shipper to be used over again.

The invention seeks, as a further object, to provide a device which, after a vehicle is placed upon a car for shipment, may be readily attached to the car floor for chocking the wheels of the vehicle, and wherein the device will be so formed that mutilation or abrasion of the wheel tires will be effectually avoided.

And the invention seeks, as a still further object, to provide a device which may be adjusted to snugly accommodate wheel tires of different diameters so that the device will thus not only be adapted for use in connection with vehicles having small tires but will also be equally well adapted for use in connection with vehicles having large tires.

Other objects of the invention not specifically mentioned in the foregoing will appear during the course of the following description.

In the accompanying drawings:

Figure 1 is a perspective view showing the use of the wheel chock in connection with a conventional motor vehicle.

Figure 2 is a plan view of the device.

Figure 3 is a detail perspective view showing one of the sections of the device.

In shipping motor vehicles, as at present prevalently practiced, wooden wheel chocks are nailed to the car floor for preventing movement of the vehicles during transit. In the aggregate, much lumber is thus wasted since, at the point of destination, the wooden chocks are discarded. Furthermore, in thus nailing the chocks to the floor of the car, the car floor is often mutilated at the time the nails are withdrawn. The present invention, therefore, seeks to avoid this contingency and, by providing a chock which may be used repeatedly, to eliminate the unnecessary expense and waste incident to the use of the present wooden chocks.

In accordance with the present invention, the body of the device is formed of a pair of complemental sections 10, one of which is shown in detail in Figure 3. These sections are preferably constructed of suitable resilient sheet metal bent to provide lateral base flanges 11 at the lower edges of the sections and, as will be observed, said base flanges are extended, at the forward vertical edges of the sections, to provide forwardly projecting apertured ears 12. Projecting from the sections at their forward vertical edges are inturned flanges 13, and projecting from the lower end portions of the inclined edges of said sections are inturned flanges 14. As shown in Figure 2, the flanges 13 of the sections overlap each other and, likewise, the flanges 14 overlap. Extending in opposite directions from the upper end portions of the inclined edges of the sections are laterally and upwardly curved wings 15 which occupy the major portion of the length of said edges and, as seen in Figure 2, cooperate to define a substantially trough-shaped tire saddle. Thus, as will be perceived, each of the sections constitutes an integral structure which may be easily and economically produced. Extending through the flat body portions of the sections, near the forward ends thereof, is a bolt 16 adjustably connecting the sections with each other.

In Figure 1 of the drawings, I have shown the use of the device in connection with a conventional motor vehicle. In loading the vehicle upon a car, the vehicle is first arranged in the desired position when, as shown, a pair of the chocks is disposed in front of the front wheels of the vehicle and another pair of the chocks disposed behind the rear wheels, the wheel tires seating snugly in the saddles formed by the wings 15 of the said chocks. Lag screws 17 are then inserted through the ears 12 of the chocks and sunk into the car floor for anchoring the chocks. Thus, the chocks may be readily installed and will serve to prevent either forward or rearward movement of the vehicle. Furthermore, attention is directed to the fact that the wings 15 of the chocks are of a length to extend partially across the sides of the wheel tires so that said wings will coact with the tires for preventing possible lateral shifting of the vehicle. The wings are shaped to substantially conform to the contour of the tires so that abrasion or mutilation of the tires will be avoided and by adjusting the nuts of the bolts 16, when initially installing the chocks, the sections of the respective chocks may, as shown in dotted lines in Figure 2, be adjusted laterally so that the wings of the several chocks may not only be arranged to firmly grip the wheel tires but also, the wings of the several chocks may be positioned with respect to each other to snugly receive tires of different diameters therebetween. The device is thus rendered well adapted for general use. After the vehicle has reached its destination, the lag screws 17 are taken out and the chocks removed for freeing the vehicle, when the chocks are returned to the shipper to be used over again.

Having thus described the invention, what I claim is:

1. A wheel chock including a body formed of companion sections having wings to embrace the tire of a wheel chocked by the body, said sections being provided with flanges, and means adjustably connecting said sections with each other and maintain the flanges in overlapped relation.

2. A wheel chock including a body formed of companion substantially triangular sections provided at their inclined edges with oppositely directed resilient wings to yieldably embrace the tire of a wheel chocked by the body.

3. A wheel chock including a body formed of companion substantially triangular sections having lateral base flanges and overlapping flanges at their vertical edges as well as overlapping flanges at their inclined edges, the sections being formed at their inclined edges with oppositely directed wings to embrace the tire of a wheel chocked by the body, and means connecting the sections with each other.

In testimony whereof I affix my signature.

ORA W. TURNBAUGH. [L. S.]